July 12, 1927.  H. MOSSBACH  1,635,382

GASOLINE GAUGE

Filed March 1, 1923   2 Sheets-Sheet 1

INVENTOR
HENRY MOSSBACH
BY
Richard J. Cook
ATTORNEY

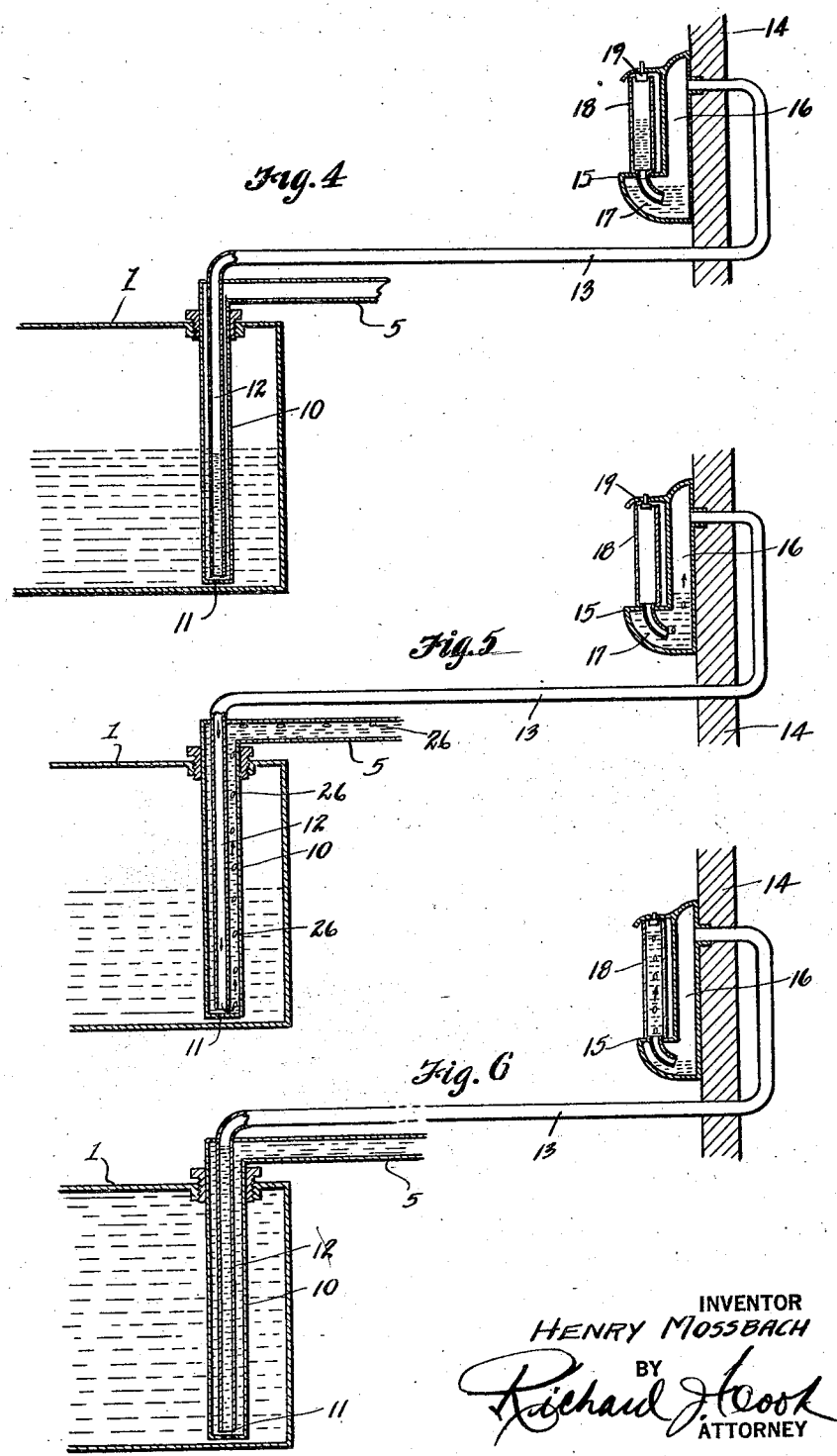

Patented July 12, 1927.

1,635,382

UNITED STATES PATENT OFFICE.

HENRY MOSSBACH, OF SEATTLE, WASHINGTON.

GASOLINE GAUGE.

Application filed March 1, 1923. Serial No. 621,982.

This invention relates to improvements in gauges of that character used in connection with gasoline or oil supply tanks of automobiles, trucks, etc., whereby the amount of the supply may be indicated to the driver of the vehicle.

It is the principal object of this invention to provide a device for the above stated purpose, operable under the influence of a vacuum feed mechanism of a type commonly used in automobiles, and employing a liquid indicating medium that is caused to rise at intervals within a graduated gauge tube by means of air trapped within an air pipe connection between the tube and the supply tank, to thereby indicate the amount of the supply within the tank.

Another object of the invention is to provide a construction that will prevent inaccuracies in the readings due to temperature or atmospheric changes, especially such changes as are caused by the heat from the engine of the vehicle.

A still further object resides in the details of construction of the container for the indicating liquid and the manner in which it is connected with the gauge tube and with the supply tank and vacuum feed mechanism.

Another object of the invention resides in the provision in the above system of means whereby each operation of the vacuum feed mechanism effects the clearing of the air tube connection with the gauge of gasoline so that a new reading is made after each operative period of the vacuum feed mechanism.

In accomplishing these and other objects of the invention, I have provided the improved details of construction, the preferred forms of which are illustrated in the accompanying drawings, wherein—

Figure 4 is an enlarged, sectional view of the parts embodied in the system showing the indicating medium at rest during an inoperative period of the vacuum feed mechanism.

Figure 5 is a similar view illustrating the withdrawing of the indicating liquid from the gauge into the gauge chamber during an operating period of the vacuum system. Also the clearing of the inner end of the air tube of gasoline and the intaking of air through the gauge tube and air tube into the suction tube of the vacuum system.

Figure 6 is another view illustrating the passage of air through the indicating liquid outwardly through the gauge tube in case of overflow in the supply tank.

Referring more in detail to the drawings—

Figure 1:
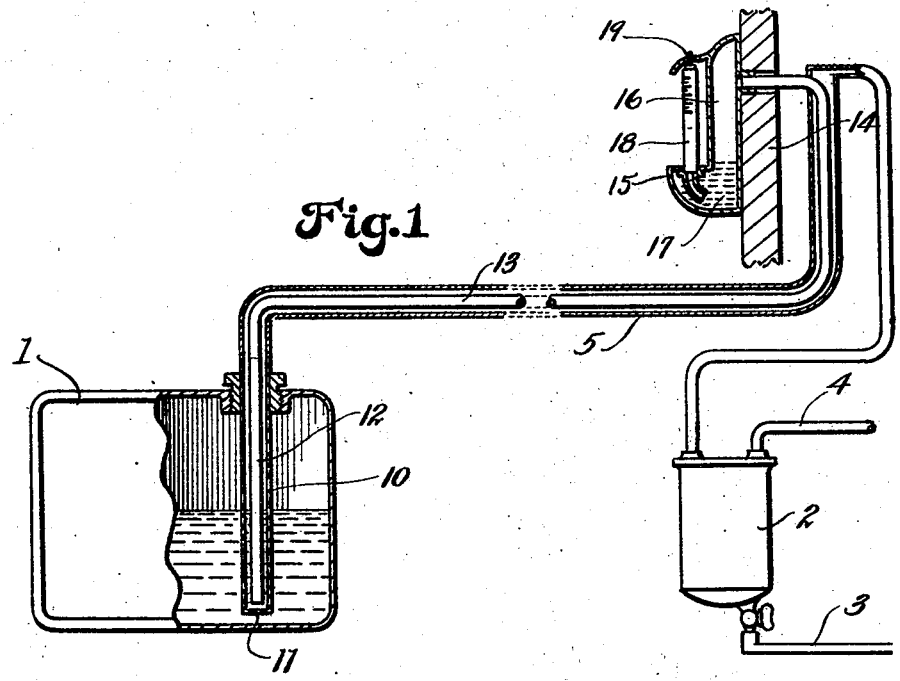
Figure 1 is a diagrammatic illustration showing, in section, a system embodied by the present invention and its connection with the gravity tank of a vacuum supply system.
Figure 2:
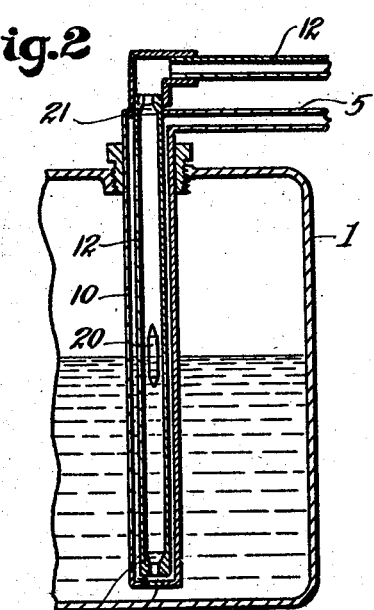
Figure 2 is an enlarged detail view of an alternative construction for the parts that are located within the supply tank.

1 designates a liquid receptacle such as the gasoline supply tank of an automobile, and 2 designates what may be the gravity tank of the vacuum feed system whereby gasoline is supplied through a conduit 3 to the carburetor of the vehicle engine. The tank 2 is connected by means of a suction tube 4 with the fuel distributing manifold of the engine, not shown, and has a conduit 5 leading therefrom to the supply tank 1. This conduit, which I hereinafter refer to as the suction or discharge tube, is preferably extended to inclose an air tube that connects with the gauge, presently described, as is illustrated in Figure 1, or it may be extended to the tank directly, as is illustrated in Figure 2.

The present system is intended for use in vehicles equipped with a vacuum feed system which operates under the control of vacuum pressure created within the manifold of the engine and communicated to the tank 2 through the conduit connection 4. In this arrangement provision is made by means of suitable valve mechanism, not shown, that is located within the tank 2 for drawing gasoline intermittently from the tank 1 through the conduit 5, to flow from the latter to the carburetor of the engine through the conduit 3; however, other types of suction mechanism could be used with same results and I do not wish to confine myself only to this type.

Extending vertically into the top of the tank 1 is a tube 10, which, at its upper end, connects with or is a continuation of the tube 5 and within its lower end, that terminates closely adjacent to the bottom wall of the gasoline tank, it is provided with a small filling aperture 11.

Extending centrally within the tube 10 and from the upper end thereof is a small tube 12 which connects with or is formed as a continuation of a tube 13 that is extended within the tube 5 to the dash board 14 of the vehicle, and is there connected with an air pressure actuated indicator, or gauge, consisting of a container 15 wherein there is a closed chamber 16 partially filled with an indicating liquid 17. The tube 13 connects with this chamber at a point that is always above the level of the indicating liquid. A graduated, glass gauge tube 18 is mounted so that it may receive, at its lower end, the liquid 17 when the latter is forced from the chamber 16 by an inflow of air into the chamber and the upper end of the gauge tube is open to atmosphere so as to permit an intaking of air into the chamber 16 through the tube. The amount of indicating liquid used is accurately measured so that, when diminishing pressure in the chamber 16 causes all of the liquid to be drawn thereinto from the gauge tube, it will not rise in the chamber to a height where it will be drawn into the air tube 13 neither will there be sufficient liquid that the gauge tube could be filled to overflowing.

Assuming that the device is so constructed and assembled as described, the operation would be as follows:

With the tank 1 empty, the liquid in the gauge tube 18 would register at zero, then when gasoline is poured into the tank and it rises through opening 11 into the tube 10 and then into the open end of the air tube 12 a certain amount of air will be trapped within the tube 12, and as the gasoline rises in the tank, this air will be compressed to create a pressure within the chamber 16 containing the indicating liquid, thereby causing the liquid to be forced from the chamber and to rise within the gauge tube; this being graduated so that the amount of liquid in the supply tank will be indicated by reference to the graduations.

Thus far the operation of my invention is somewhat similar to previous devices of this character. It will now be shown that I have made an advance in this art by overcoming the defects caused by the column of air being continually trapped within the pressure tube and resulting in an erroneous reading caused by any change in volume of said trapped air.

When the engine is running and gasoline is intermittently sucked into the gravity tank 2 through the tube 5 by means of the vacuum feed system, it will be understood that the opening 11 is made so small that the suction will remove all the gasoline from the tube 10 faster than it can enter through said small opening, therefore entirely removing gasoline from tubes 12 and 13. In fact the smallness of this opening will cause a surplusage of suction which will act through the tubes 12 and 13. This surplusage will draw all the reading liquid 17 out of the gauge glass 18 and upwardly into the chamber 16, but never as high as the mouth of the tube 13. This surplusage will also be strong enough to draw fresh air through the port 19 which air will pass through the reading liquid 17 in the form of minute bubbles and will be sufficient in quantity to completely replenish the old air within tubes 12 and 13, which will be sucked out and mixed with the gasoline. At the same time this suction will remove all moisture, liquid or other substance which would tend to give a false reading of the gauge. It will thus be seen that said tubes are intermittently supplied with fresh air at atmospheric temperature and substantially at a constant volume and consequently giving a correct gauge reading at all times.

The condition during an operating period of the vacuum mechanism is illustrated in Figure 5 of the drawing, wherein the tube 12 is shown to be cleared of gasoline and air is entering the tube 13 after passing through the gauge tube and through the indicating liquid in the form of bubbles, as is indicated at 26.

Figure 4 illustrates the extent to which the air tube 12 will be filled with gasoline after the vacuum system has stopped operating and the rise of the indicating fluid within the gauge tube.

In Figure 2 I have illustrated an alternative construction for preventing splashing within the supply tank or back pressure or overflow from causing gasoline to be forced upwardly from the tube 10 into the gauge tube. Also to prevent suction from withdrawing air from the chamber 16. In doing this, I have placed a float valve 20 within the tube 12 which has tapered ends adapted to engage against valve seats 21 and 22 located respectively in the upper and lower ends of the tube. This float rises and falls in accordance with the level of liquid in the tube 12 and operates automatically.

Figure 3:
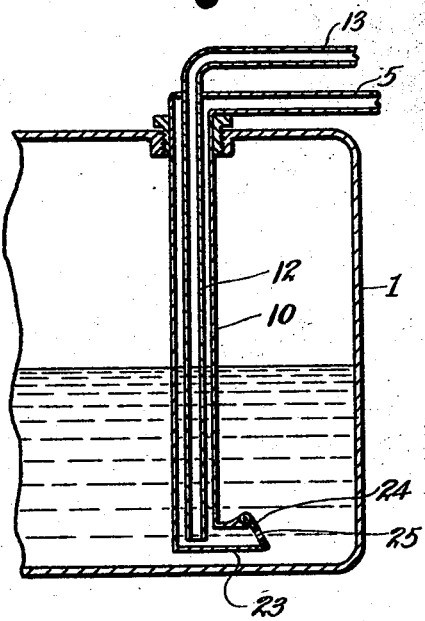
Figure 3 is a similar view of another alternative construction.

In Figure 3, I have illustrated another alternative construction similar to that illustrated in Figure 1, but wherein the lower end of the tube 10 is equipped with a lateral extension 23 adapted to be closed by a valve plate 24 that is hingedly attached at its upper edge to the top edge of the extension and is held by gravity against the open end of the extension. The valve plate may be swung outwardly to open position and is provided with a small aperture 25 through which gasoline flows to fill the tubes. This valve plate is provided in order to give a large opening through which gasoline left in the tube 5 at the time the suction apparatus stops operating, may run quickly back into the tank and not back up into tube 13, yet which normally provides only a small inlet to the tube 5 so that suction in the latter will operate to completely drain the pipe 13.

Having thus described my invention, what I claim as new therein and desire to secure by Letters Patent, is:

1. The combination with a fuel supply tank and a fuel feed system including a pipe that is extended into the said tank and has a restricted inlet, and means whereby suction is created intermittently in said pipe to effect a withdrawal of fuel from the tank, of an indicating device comprising a closed receptacle containing an indicating liquid and a gauge tube open to atmosphere at its upper end and communicating at its lower end with the indicating liquid in the receptacle and in which the indicating liquid will rise and fall in accordance with variations of pressure within the receptacle, an air tube connected at one end with the top of the said receptacle and having its other end disposed within the suction pipe in such manner as to receive fuel therein from the fuel tank during inactive periods of the suction means to thereby effect a rise of the indicating liquid in the gauge tube, there being created during active periods of the suction means an inward flow of air through the gauge tube, indicating liquid and receptacle which removes liquid from the gauge tube and fuel from the air tube.

2. The combination with a fuel supply tank and a fuel feed system including a pipe that extends vertically into the said tank to closely adjacent the bottom thereof and is provided at its end with a relatively small port and means whereby suction is created intermittently in said pipe to effect the withdrawal of fuel from the tank, of an indicator comprising a closed receptacle containing an indicating liquid, a gauge tube open at its upper end to atmosphere and communicating at its other end with the indicating liquid in the receptacle and in which the liquid will rise and fall in accordance with variations of pressure in the receptacle, an air tube connected at one end with the top of the said receptacle and having its other end enclosed within the suction pipe and extended therein to a point closely adjacent the port of the latter so that fuel will rise therein during inactive periods of the suction means to effect a rise of indicating liquid in the gauge tube, said suction pipe and air tube being so assembled that during each active period of the suction means there will be created an inflow of air through the gauge tube, liquid and receptacle to remove the liquid from the gauge tube and fuel from the lower end of the air tube.

3. The combination with a fuel supply tank and a fuel feed system including a pipe that extends vertically into the tank to a point closely adjacent the bottom thereof and is provided at its end with a relatively small port and means whereby suction is created intermittently in said pipe to effect the withdrawal of fuel from the supply tank, of an indicator comprising a closed receptacle partly filled with an indicating liquid, a gauge tube open to atmosphere at its upper end and communicating at its lower end with the indicating liquid in said receptacle to receive the indicating liquid, an air tube connected at one end with the top of the receptacle and having its other end extended within the suction pipe to a point closely adjacent the port of the latter and adapted during inactive periods of the suction means to receive liquid from the fuel tank thereinto to thereby give a reading in the gauge tube, the said air tube being of substantially greater internal diameter than the port of the suction pipe so that suction within the latter will effect the withdrawal of the liquid from the lower portion of the air tube and create an inward flow of air through the gauge tube, liquid and receptacle of the indicator to remove the liquid from the gauge tube.

Signed at Seattle, King County, Washington, this 19th day of February, 1923.

HENRY MOSSBACH.